United States Patent
Partlo et al.

(10) Patent No.: US 8,283,643 B2
(45) Date of Patent: Oct. 9, 2012

(54) SYSTEMS AND METHODS FOR DRIVE LASER BEAM DELIVERY IN AN EUV LIGHT SOURCE

(75) Inventors: William N. Partlo, Poway, CA (US); Igor V. Fomenkov, San Diego, CA (US); Jason Paxton, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 369 days.

(21) Appl. No.: 12/592,107

(22) Filed: Nov. 18, 2009

(65) Prior Publication Data

US 2010/0127191 A1 May 27, 2010

Related U.S. Application Data

(60) Provisional application No. 61/200,222, filed on Nov. 24, 2008.

(51) Int. Cl.
*A61N 5/00* (2006.01)
*A61N 5/06* (2006.01)

(52) U.S. Cl. .............. 250/504 R; 250/492.1; 250/492.2; 250/365; 359/333; 359/349; 359/359

(58) Field of Classification Search ............... 250/504 R
See application file for complete search history.

(56) References Cited

U.S. PATENT DOCUMENTS

| | | | |
|---|---|---|---|
| 6,210,865 B1 | 4/2001 | Sweatt et al. | |
| 6,549,551 B2 | 4/2003 | Ness et al. | 372/38.07 |
| 6,567,450 B2 | 5/2003 | Myers et al. | 372/55 |
| 6,625,191 B2 | 9/2003 | Knowles et al. | 372/55 |
| 6,882,704 B2 * | 4/2005 | Schriever et al. | 378/119 |
| 6,947,124 B2 * | 9/2005 | Antoni et al. | 355/67 |
| 7,006,595 B2 * | 2/2006 | Singer et al. | 378/34 |
| 7,109,497 B2 * | 9/2006 | Antoni et al. | 250/492.2 |
| 7,186,983 B2 * | 3/2007 | Mann et al. | 250/365 |
| 7,250,621 B2 * | 7/2007 | Gaebel et al. | 250/504 R |
| 7,348,565 B2 * | 3/2008 | Mann et al. | 250/365 |
| 7,355,191 B2 * | 4/2008 | Bykanov et al. | 250/504 R |
| 7,372,056 B2 * | 5/2008 | Bykanov et al. | 250/504 R |
| 7,405,416 B2 | 7/2008 | Algots et al. | 250/493.1 |
| 7,439,530 B2 | 10/2008 | Ershov et al. | 250/504 |
| 7,443,948 B2 * | 10/2008 | Schultz et al. | 378/34 |
| 7,456,408 B2 * | 11/2008 | Mann et al. | 250/365 |
| 7,465,946 B2 | 12/2008 | Bowering et al. | 250/504 |
| 7,474,733 B1 * | 1/2009 | Yamamoto | 378/84 |
| 7,491,954 B2 * | 2/2009 | Bykanov et al. | 250/504 R |

(Continued)

OTHER PUBLICATIONS

PCT Search Report dated Jan. 2, 2010, International Patent Application No. PCT/US 09/06186 filed Nov. 19, 2009 (8 pages).

*Primary Examiner* — David A Vanore
(74) *Attorney, Agent, or Firm* — Cymer, Inc.

(57) ABSTRACT

An EUV light source device is described herein which may comprise a laser beam travelling along a beam path, at least a portion of the beam path aligned along a linear axis; a material for interaction with the laser beam at an irradiation site to create an EUV light emitting plasma; a first reflector having a focal point, the first reflector positioned with the focal point on the linear axis, the first reflector receiving laser light along the beam path; and a second reflector receiving laser light reflected by the first reflector and directing the laser light toward the irradiation site.

28 Claims, 7 Drawing Sheets

U.S. PATENT DOCUMENTS

| | | | |
|---|---|---|---|
| 7,589,337 B2 * | 9/2009 | Bykanov et al. | 250/504 R |
| 7,592,598 B2 * | 9/2009 | Mann et al. | 250/365 |
| 7,598,509 B2 | 10/2009 | Ershov et al. | 250/504 |
| 7,732,794 B2 * | 6/2010 | Abe et al. | 250/504 R |
| 7,916,388 B2 * | 3/2011 | Bykanov | 359/349 |
| 7,928,418 B2 * | 4/2011 | Soumagne et al. | 250/504 R |
| 7,977,651 B2 * | 7/2011 | Mann et al. | 250/492.1 |
| 8,000,212 B2 * | 8/2011 | Senekerimyan et al. | 369/121 |
| 8,017,924 B2 * | 9/2011 | Bykanov et al. | 250/504 R |
| 8,035,092 B2 * | 10/2011 | Bykanov et al. | 250/504 R |
| 2004/0108473 A1 * | 6/2004 | Melnychuk et al. | 250/504 R |
| 2004/0256575 A1 | 12/2004 | Singer et al. | 250/492.2 |
| 2005/0146768 A1 | 7/2005 | Wang et al. | 359/245 |
| 2006/0146906 A1 * | 7/2006 | Brown et al. | 372/57 |
| 2006/0148906 A1 * | 7/2006 | Bieniarz et al. | 514/723 |
| 2006/0255298 A1 | 11/2006 | Bykanov et al. | 250/504 |
| 2008/0029717 A1 * | 2/2008 | Shirai | 250/504 R |
| 2008/0043321 A1 * | 2/2008 | Bowering et al. | 359/359 |
| 2009/0014668 A1 | 1/2009 | Vaschenko | 250/504 |
| 2009/0161201 A1 * | 6/2009 | Ershov et al. | 359/333 |
| 2009/0250637 A1 * | 10/2009 | Akins et al. | 250/492.1 |
| 2009/0267005 A1 * | 10/2009 | Bykanov et al. | 250/504 R |
| 2010/0127191 A1 * | 5/2010 | Partlo et al. | 250/504 R |
| 2010/0176312 A1 * | 7/2010 | Komori et al. | 250/504 R |
| 2010/0181503 A1 * | 7/2010 | Yanagida et al. | 250/504 R |
| 2010/0258750 A1 * | 10/2010 | Partlo et al. | 250/504 R |
| 2010/0327192 A1 * | 12/2010 | Fomenkov et al. | 250/504 R |

\* cited by examiner

SYSTEMS AND METHODS FOR DRIVE LASER BEAM DELIVERY IN AN EUV LIGHT SOURCE

The present application claims priority to Provisional U.S. Patent Application Ser. No. 61/200,222, filed Nov. 24, 2008, entitled "SYSTEMS AND METHODS FOR DRIVE LASER BEAM DELIVERY IN AN EUV LIGHT SOURCE".

FIELD

The present application relates to extreme ultraviolet ("EUV") light sources providing EUV light from a plasma created from a source material and collected and directed to a focus for utilization outside of the EUV light source chamber, e.g., for semiconductor integrated circuit manufacturing photolithography e.g., at wavelengths of around 100 nm and below.

BACKGROUND

Extreme ultraviolet ("EUV") light, e.g., electromagnetic radiation having wavelengths of around 5-100 nm or less (also sometimes referred to as soft x-rays), and including light at a wavelength of about 13 nm, can be used in photolithography processes to produce extremely small features in substrates, e.g., silicon wafers.

Methods to produce EUV light include, but are not necessarily limited to, converting a material into a plasma state that has an element, e.g., xenon, lithium or tin, with an emission line in the EUV range. In one such method, often termed laser produced plasma ("LPP") the required plasma can be produced by irradiating a target material, for example in the form of a droplet, stream or cluster of material, with a laser beam (generated by a so-called "drive laser").

For this process, the plasma is typically produced in a sealed vessel, e.g., vacuum chamber, and monitored using various types of metrology equipment. In addition to generating EUV radiation, these plasma processes also typically generate undesirable by-products in the plasma chamber which can include out-of-band radiation, high energy ions and debris, e.g., atoms and/or clumps/microdroplets of the target material.

These plasma formation by-products can potentially heat, damage or reduce the operational efficiency of the various plasma chamber optical elements including, but not limited to, collector mirrors including multi-layer mirrors (MLM's) capable of EUV reflection at normal incidence and/or grazing incidence, the surfaces of metrology detectors, windows used to image the plasma formation process, and the laser input window. The heat, high energy ions and/or debris may be damaging to the optical elements in a number of ways, including coating them with materials which reduce light transmission, penetrating into them and, e.g., damaging structural integrity and/or optical properties, e.g., the ability of a mirror to reflect light at EUV wavelengths, corroding or eroding them and/or diffusing into them. Thus, it is typically desirable to minimize the amount of and/or the effect of plasma generated debris.

As indicated above, one technique to produce EUV light involves irradiating a target material. In this regard, $CO_2$ lasers, e.g., outputting light at infra-red wavelengths, e.g. 9.3 µm or 10.6 µm, may present certain advantages as a drive laser irradiating a target material in an LPP process. This may be especially true for certain target materials, e.g., materials containing tin. For example, one advantage may include the ability to produce a relatively high conversion efficiency between the drive laser input power and the output EUV power. Another advantage of $CO_2$ drive lasers may include the ability of the relatively long wavelength light (for example, as compared to deep UV at 193 nm or Nd:YAG at 1.06 µm) to strongly reflect from relatively rough surfaces, such as surfaces that have become contaminated or coated with debris.

Another factor worthy of consideration is the difficulty associated with consistently and accurately hitting a series of relatively small, quickly moving droplets with a pulsed laser beam at relatively high repetition rates. For example, some high-volume EUV light sources may call for the irradiation of droplets having a diameter of about 5-50 µm and moving at a velocity of about 50-100 m/s, at repetition rates exceeding 30 kHz. Although one goal of LPP system design may be to provide a consistent, accurately timed series of target material droplets, it may be necessary to overcome shortcomings in droplet stability by quickly steering, focusing and in some cases changing the focal power of the irradiating laser beam. In addition, it may be desirable to accurately focus the beam to a relatively small focal spot with minimal aberrations. This may be especially challenging when the laser is a high power, multi-mode laser.

With the above in mind, applicants disclose systems and methods for drive laser beam delivery in an EUV light source.

SUMMARY

In a first aspect, an EUV light source device is described herein which may comprise a laser beam travelling along a beam path, at least a portion of the beam path aligned along a linear axis; a material for interaction with the laser beam at an irradiation site to create an EUV light emitting plasma; a first reflector having a focal point, the first reflector positioned with the focal point on the linear axis, the first reflector receiving laser light along the beam path; and a second reflector receiving laser light reflected by the first reflector and directing the laser light toward the irradiation site.

In one embodiment described herein, the source may further comprise a vessel, the irradiation site may be within the vessel and the first reflector may be positioned in the vessel and in fluid communication with the irradiation site.

In a particular embodiment described herein, the EUV light source may further comprise an EUV reflective mirror having a first focus at the irradiation site and a second focus, and the EUV reflective mirror may be positioned to interpose the EUV reflective mirror between the first reflector and the irradiation site along the linear axis.

In one arrangement of this aspect, the EUV light source may further comprise a laser device generating the laser beam, the laser device comprising at least one reflective optic establishing a beam path through the irradiation site and wherein the material cooperates with the optic to establish and optical cavity therebetween when the material is at the irradiation site, and wherein the laser device further comprises a gain medium excitable to establish optical gains exceeding optical losses in the cavity to generate a laser beam for irradiating the material.

In one setup, the reflective optic may transmit light at a wavelength, λ, and the EUV light source may further comprise an alignment laser passing an alignment laser beam having a wavelength, λ, through the reflective optic and a monitor receiving the alignment laser beam after reflection from the second reflector.

In one embodiment described herein, the second reflector may be mounted on a tip/tilt actuator.

In a particular embodiment described herein, the first reflector may have a corrected parabolic shape.

In one arrangement of this aspect, the second reflector may be formed with a flat reflective surface and in another arrangement the second reflector may be formed with a curved reflective surface.

In one setup, the laser device may have a gain medium comprising $CO_2$ and the material may comprise tin.

In one embodiment described herein, the EUV light source may further comprise an adaptive optic adjustable to selectively vary the beam diameter and divergence of the beam at the first reflector.

In another aspect, an EUV light source device is described herein which may comprise an optic for reflecting light of wavelength $\lambda_1$, and transmitting light of wavelength $\lambda_2$, with $\lambda_1 \neq \lambda_2$, a material cooperating with the optic to establish an optical cavity therebetween when the material is at an irradiation site; a gain medium excitable to establish optical gains exceeding optical losses in the cavity to generate a laser beam for irradiating the material to produce an EUV light emission; an alignment laser positioned to pass an alignment laser beam having a wavelength, $\lambda_2$, through the reflective optic; and a monitor receiving the alignment laser beam to verify an alignment of at least one optical component in the cavity.

In a particular embodiment described herein, the material may be a liquid droplet.

In one arrangement of this aspect, the EUV light source may be configured with $\lambda_1 > 5$ μm and $\lambda_2 < 1$ μm.

In another aspect, an EUV light source device is described herein which may comprise a laser beam travelling along a beam path; an optic focusing the laser beam to an irradiation site on the beam path; a material for interaction with the laser beam at the irradiation site to create an EUV light emitting plasma; a monitor measuring a beam parameter and outputting a signal indicative thereof; and an adaptive optic responsive to the signal for modifying the laser beam to have a pre-selected beam divergence and beam width at the focusing optic.

In one embodiment of this aspect, the adaptive optic may comprise first and second optical components with the first optical component moveable relative to the second optical component.

In a particular embodiment of this aspect, the adaptive optic may comprise at least one deformable optical component.

In a particular arrangement of this aspect, the beam parameter may be divergence.

In one setup of this aspect, the beam parameter may be wavefront.

In a particular arrangement of this aspect, the beam parameter may be beam width.

DETAILED DESCRIPTION

Figure 1:
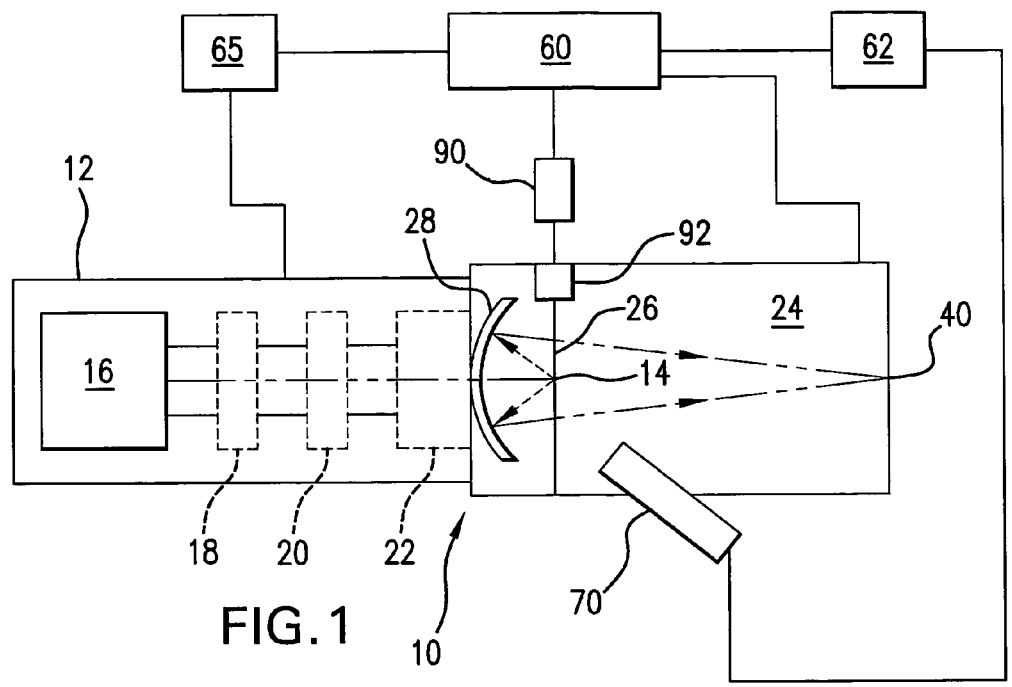
FIG. 1 shows a simplified schematic view of a laser-produced plasma EUV light source according to an aspect of the present disclosure.

With initial reference to FIG. 1 there is shown a schematic view of an EUV light source, e.g., a laser-produced-plasma, EUV light source 10 according to one aspect of an embodiment. As shown in FIG. 1, and described in further detail below, the EUV light source 10 may include a system 12 for generating and delivering a train of light pulses to an irradiation site 14. As shown, the system 12 may include a device 16 for generating pulses (which in some cases may include one or more main pulses and one or more pre-pulses). For example, the device 16 may include a gain medium such as a gas including $CO_2$, and an excitation system.

Also shown in FIG. 1, the system 12 may also include one or more beam manipulation subsystems (shown with dashed lines to indicate an optional component), which can include a beam shaping subsystem 18, e.g., to selectively alter the beams divergence, beam width, wavefront, etc., a beam steering subsystem 20 and/or a beam focusing subsystem 22. Although FIG. 1 shows these systems as discrete subsystems and shows the subsystems in a particular order relative to the device 16, it is to be appreciated that one or more optical components may function within two or more subsystems, e.g., one mirror may function to both steer and focus, the sub-system order may be changed, e.g., the beam may be focused prior to steering etc., and for some applications, one or more of the subsystems 18, 20, 22 may be eliminated, e.g., beam shaping may be unnecessary. Other components such as an isolator (not shown) may be provided to isolate portions or all of the system 12 from at least some downstream reflections. For the EUV light source 10, a light pulse may travel along a beam path from the system 12 and into the chamber 24 to illuminate a respective target droplet 26 at an irradiation site 14, e.g., at or near a focus of mirror 28.

Device 14 may include one or more lasers and/or lamps for providing one or more main pulses and, in some cases, one or more pre-pulses. Suitable lasers for use in the device 14 shown in FIG. 1 may include a pulsed laser device, e.g., a pulsed, gas-discharge $CO_2$ laser device producing radiation at 9.3 μm or 10.6 μm, e.g., with DC or RF excitation, operating at relatively high power, e.g., 10 kW or higher and high pulse repetition rate, e.g., 50 kHz or more. In one particular implementation, the laser may be an RF-pumped $CO_2$ laser having a MOPA configuration with multiple stages of amplification and having a seed pulse that is initiated by a Q-switched Master Oscillator (MO) with low energy and high repetition rate, e.g., capable of 100 kHz operation. From the MO, the laser pulse may then be amplified, for example, using RF pumped, fast axial flow, $CO_2$ amplifiers. Details regarding a particular MOPA arrangement are provided below. Alternatively, the laser may be configured as a so-called "self-targeting" laser system in which the droplet serves as one mirror of the optical cavity. In some "self-targeting" arrangements, a master oscillator may not be required. Details regarding a particular self-targeting arrangement are provided below.

Depending on the application, other types of lasers may also be suitable, e.g., an excimer or molecular fluorine laser operating at high power and high pulse repetition rate. Examples include, a solid state laser, e.g., having a fiber or disk shaped gain medium, a MOPA configured excimer laser system, e.g., as shown in U.S. Pat. Nos. 6,625,191, 6,549,551, and 6,567,450, an excimer laser having one or more chambers, e.g., an oscillator chamber and one or more amplifying chambers (with the amplifying chambers in parallel or in series), a master oscillator/power oscillator (MOPO) arrangement, a power oscillator/power amplifier (POPA) arrangement, or a solid state laser that seeds one or more excimer or molecular fluorine amplifier or oscillator chambers, may be suitable. Other designs are possible.

As further shown in FIG. 1, the EUV light source 10 may also include a target material delivery system 30, e.g., delivering droplets 26 of a target material into the interior of a chamber 24 to the irradiation site 14 where the droplets will interact with one or more light pulses, e.g., zero, one or more pre-pulses and thereafter one or more main pulses, to ultimately produce a plasma and generate an EUV emission. The target material may include, but is not necessarily limited to, a material that includes tin, lithium, xenon or combinations thereof. The EUV emitting element, e.g., tin, lithium, xenon, etc., may be in the form of liquid droplets and/or solid particles contained within liquid droplets. For example, the element tin may be used as pure tin, as a tin compound, e.g., $SnBr_4$, $SnBr_2$, $SnH_4$, as a tin alloy, e.g., tin-gallium alloys, tin-indium alloys, tin-indium-gallium alloys, or a combination thereof. Depending on the material used, the target material may be presented to the irradiation site 14 at various temperatures including room temperature or near room temperature (e.g., tin alloys, $SnBr_4$) at an elevated temperature, (e.g., pure tin) or at temperatures below room temperature, (e.g., $SnH_4$), and in some cases, can be relatively volatile, e.g., $SnBr_4$. More details concerning the use of these materials in an LPP EUV source is provided in co-pending U.S. patent application Ser. No. 11/406,216 filed on Apr. 17, 2006, entitled ALTERNATIVE FUELS FOR EUV LIGHT SOURCE, the contents of which are hereby incorporated by reference herein.

Continuing with FIG. 1, the EUV light source 10 may also include a mirror 28, e.g., a collector mirror in the form of a truncated prolate spheroid, having, e.g., a graded multi-layer coating with alternating layers of Molybdenum and Silicon. FIG. 1 shows that the mirror 28 may be formed with an aperture to allow the light pulses generated by the system 12 to pass through and reach the irradiation site 14. As shown, the mirror 28 may be, e.g., a prolate spheroid mirror that has a first focus within or near the irradiation site 14 and a second focus at a so-called intermediate region 40 where the EUV light may be output from the EUV light source 10 and input to a device utilizing EUV light, e.g., an integrated circuit lithography tool (not shown). It is to be appreciated that other optics may be used in place of the prolate spheroid mirror for collecting and directing light to an intermediate location for subsequent delivery to a device utilizing EUV light, for example the optic may be parabolic or may be configured to deliver a beam having a ring-shaped cross-section to an intermediate location, see e.g., co-pending U.S. patent application Ser. No. 11/505,177 filed on Aug. 16, 2006, entitled EUV OPTICS, the contents of which are hereby incorporated by reference.

Continuing with reference to FIG. 1, the EUV light source 10 may also include an EUV controller 60, which may also include a firing control system 65 for triggering one or more lamps and/or laser devices in the system 12 to thereby generate light pulses for delivery into the chamber 24. The EUV light source 10 may also include a droplet position detection system which may include one or more droplet imagers 70 that provide an output indicative of the position of one or more droplets, e.g., relative to the irradiation site 14. The imager(s) 70 may provide this output to a droplet position detection feedback system 62, which can, e.g., compute a droplet position and trajectory, from which a droplet error can be computed, e.g., on a droplet by droplet basis or on average. The droplet error may then be provided as an input to the controller 60, which can, for example, provide a position, direction and/or timing correction signal to the system 12 to control a source timing circuit and/or to control a beam shaping subsystem 18 and/or beam steering subsystem 20 e.g., to change the location and/or focal power of the light pulses being delivered to the irradiation site 14 in the chamber 24.

The EUV light source 10 may include one or more EUV metrology instruments for measuring various properties of the EUV light generated by the source 10. These properties may include, for example, intensity (e.g., total intensity or intensity within a particular spectral band), spectral bandwidth, polarization, beam position, pointing, angular distribution, etc. For the EUV light source 10, the instrument(s) may be configured to operate while the downstream tool, e.g., photolithography scanner, is on-line, e.g., by sampling a portion of the EUV output, e.g., using a pickoff mirror or sampling "uncollected" EUV light, and/or may operate while the downstream tool, e.g., photolithography scanner, is off-line, for example, by measuring the entire EUV output of the EUV light source 10.

As further shown in FIG. 1, the EUV light source 10 may include a droplet control system 90, operable in response to a signal (which in some implementations may include the droplet error described above, or some quantity derived therefrom) from the controller 60, to e.g., modify the release point of the target material from a droplet source 92 and/or modify droplet formation timing, to correct for errors in the droplets arriving at the desired irradiation site 14 and/or synchronize the generation of droplets with the pulsed laser system 12.

More details regarding various droplet dispenser configurations and their relative advantages may be found in co-pending U.S. patent application Ser. No. 11/827,803 filed on Jul. 13, 2007, entitled LASER PRODUCED PLASMA EUV LIGHT SOURCE HAVING A DROPLET STREAM PRODUCED USING A MODULATED DISTURBANCE WAVE, co-pending U.S. patent application Ser. No. 11/358,988 filed on Feb. 21, 2006, entitled LASER PRODUCED PLASMA EUV LIGHT SOURCE WITH PRE-PULSE, co-pending U.S. patent application Ser. No. 11/067,124 filed on Feb. 25, 2005, entitled METHOD AND APPARATUS FOR EUV PLASMA SOURCE TARGET DELIVERY, and co-pending U.S. patent application Ser. No. 11/174,443 filed on Jun. 29, 2005, entitled LPP EUV PLASMA SOURCE MATERIAL TARGET DELIVERY SYSTEM, the contents of each of which are hereby incorporated by reference.

Figure 2:
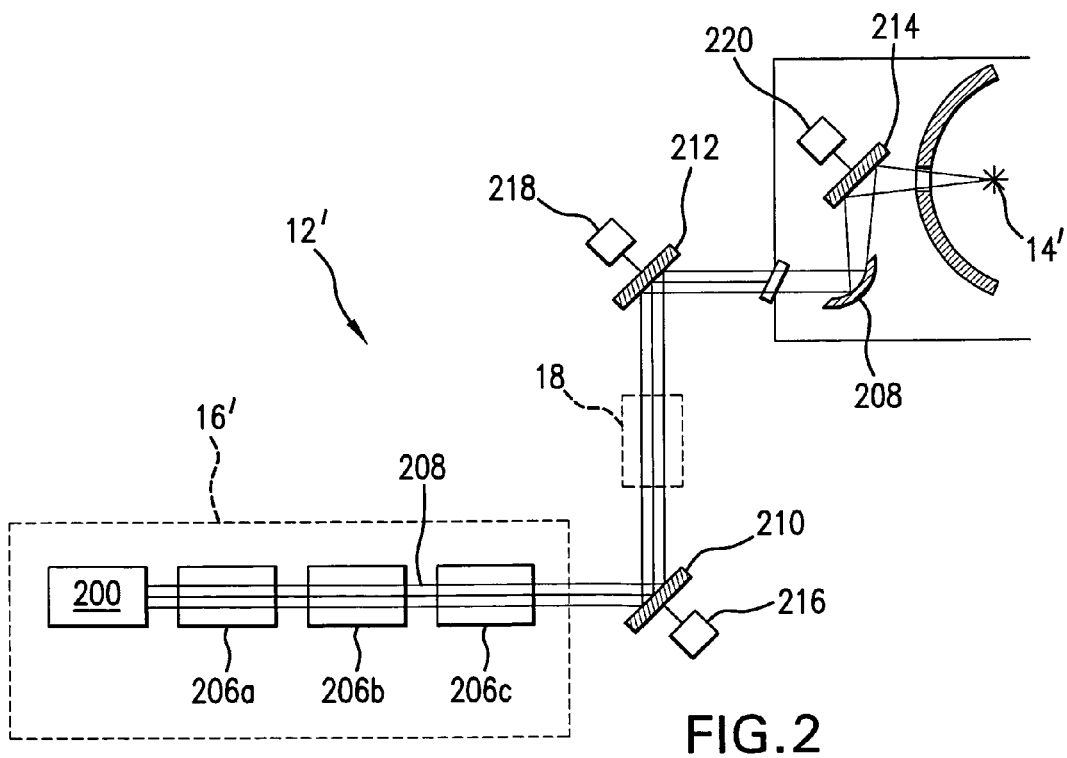
FIG. 2 shows a simplified, schematic, sectional view of an EUV light source having a MOPA drive laser, an off-axis parabolic focusing mirror and a beam shaping subsystem.

FIG. 2 shows a particular embodiment of a system 12' for generating and delivering a train of light pulses to an irradiation site 14'. As detailed below, the system 12' may include a device 16' generating pulses, a beam shaping subsystem 18, a beam steering subsystem and a beam focusing subsystem. As detailed further below with reference to specific embodiments, the beam shaping subsystem 18 may include one or more optical components for altering beam shape such as beam width, W, or divergence, θ, and may be fixed, adjustable or adjustable in response to a control signal (a so-called adaptive optic arrangement, as described below). As shown, the device 16' may include an oscillator 200 seeding an amplifier having a chain of amplifier chambers 206*a-c*, arranged in series along a beam path 208, each chamber having its own gain medium and excitation source, e.g. pumping electrodes. For the device 16', the oscillator 200/amplifier 206*a-c* combination may be used to produce a train of pulses at a wavelength, $\lambda_1$, such as 10.6 μm.

For example, the oscillator 200 may be a cavity-dumped or a Q-switched, pulsed, $CO_2$, Master Oscillator (MO) with relatively low energy and high repetition rate, e.g., capable of 100 kHz operation. For the device 16', the multi-chamber optical amplifier 206*a,b,c* may have a gain medium capable of optically amplifying one or more wavelengths within the range 9.3-10.6 μm, e.g., a high gain (G≧1,000 and in some cases 10,000) CW pumped, $CO_2$ laser amplifier. Although three amplifier chambers 206*a-c* are shown, it is to be appreciated that more than three and as few as one amplifier chamber may be used in the embodiment shown in FIG. 4. Further details regarding a suitable $CO_2$ laser device having an oscillator and three amplifiers (O-PA1-PA2-PA3 configuration) is disclosed in U.S. patent application Ser. No. 11/174,299 filed on Jun. 29, 2005, and entitled, LPP EUV LIGHT SOURCE DRIVE LASER SYSTEM, the entire contents of which are hereby incorporated by reference herein.

FIG. 2 also shows that the system 12' includes a beam focusing subsystem having a focusing optic 208, which as shown, may be disposed in the chamber 24' and exposed to plasma generated debris, and may include one or more mirrors, prisms, lenses, etc arranged to focus a light beam to a focal spot at the irradiation site 14'. For the system 12', the optic 208 may be an off-axis parabolic mirror, as shown. As detailed further below, the off-axis parabolic mirror may be corrected (i.e. modified from a perfect parabola having a uniform reflectance) to reduce aberrations for incident light having a pre-selected beam divergence θ, and/or beam width, W.

Continuing with FIG. 2, it can be seen that the system 12' may also include a beam steering subsystem having three steering mirrors 210, 212, 214. Although three mirrors are shown, it is to be appreciated that more than three and as few as one steering mirror may be employed to steer the beam. Moreover, although mirrors are shown, it is to be appreciated that other optics such as prisms may be used and that one or more of the steering optics may be positioned inside the chamber 24 and exposed to plasma-generated debris. See for example, U.S. patent application Ser. No. 11/358,992 filed on Feb. 21, 2006, and entitled LASER PRODUCED PLASMA EUV LIGHT SOURCE, the entire contents of which are hereby incorporated by reference herein. For the embodiment shown, each flat mirror 210, 212, 214 may be mounted on a respective tip-tilt actuator 216, 218, 220 which may move each mirror 210, 212, 214 independently in two dimensions.

Figure 3:
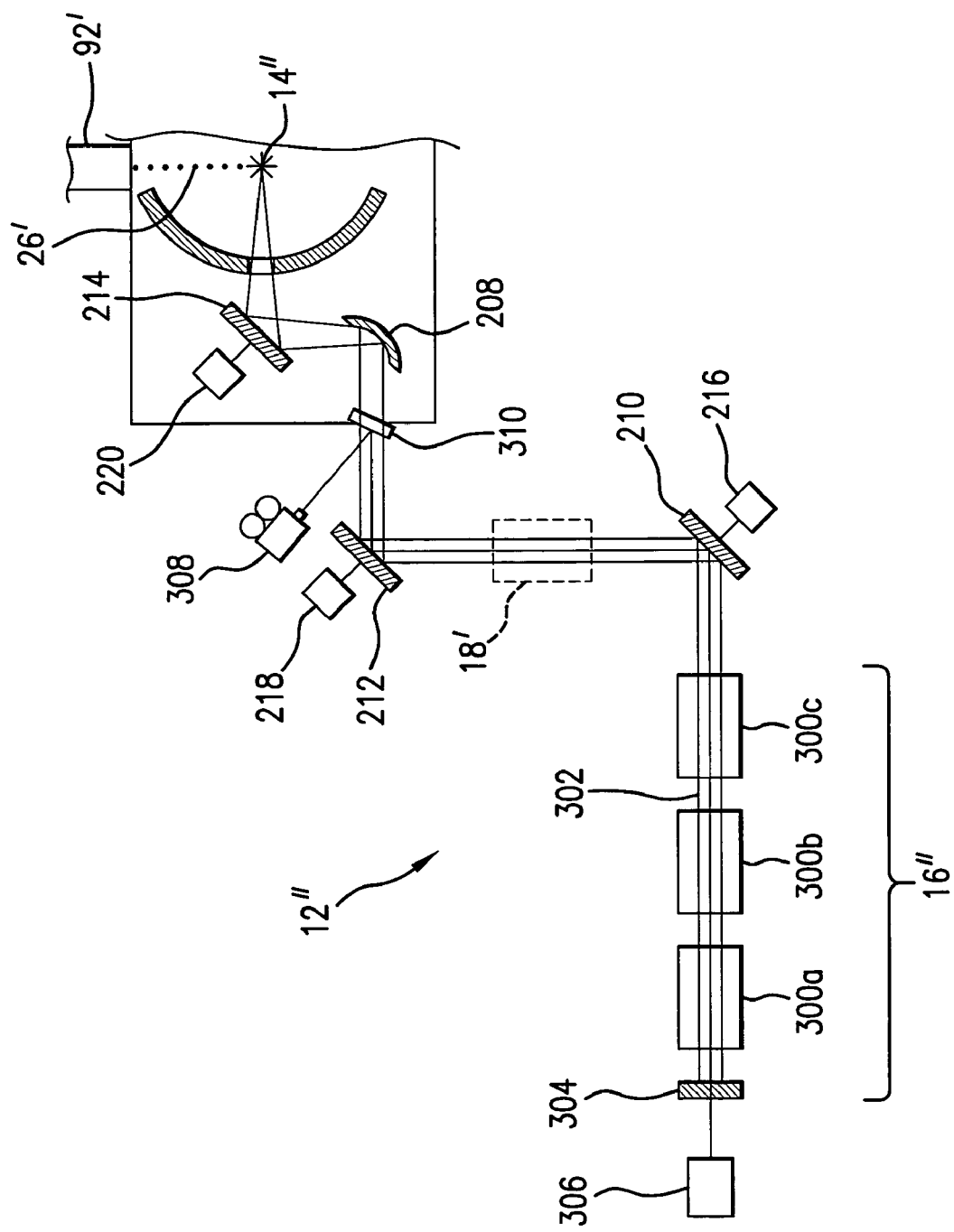
FIG. 3 shows a simplified, schematic, sectional view of an EUV light source having a self-targeting drive laser, an off-axis parabolic focusing mirror and a beam shaping subsystem.

FIG. 3 shows another particular embodiment of a system 12" for generating and delivering a train of light pulses to an irradiation site 14". As detailed below, the system 12" may include a device 16" generating pulses, a beam shaping subsystem 18', a beam steering subsystem and a beam focusing subsystem.

As detailed further below with reference to specific embodiments, the beam shaping subsystem 18' may include one or more optical components for altering beam shape such as beam width, W, or divergence, θ, and may be fixed, adjustable or adjustable in response to a control signal (a so-called adaptive optic arrangement, as described below).

As shown, the device 16" may include an amplifier having a chain of amplifier chambers 300*a-c*, arranged in series along the beam path 302, each chamber having its own gain medium and excitation source, e.g., pumping electrodes. For the device 16", the amplifier 16" may include one or more amplifier chambers, e.g. RF pumped, fast axial flow, $CO_2$ amplifier chambers (as described above), having a combined one pass gain of, for example, 1,000-10,000 for amplifying light of a wavelength $\lambda_1$, e.g. 10.6 μm.

It can further be seen in FIG. 3 that an optic 304 may be disposed on the beam path 302 to interpose the amplifier chambers 300*a-c* between the irradiation site 14" and optic 302, along the beam path 304. As shown, the system 12" may also include an alignment laser source 306 generating an alignment laser beam having a wavelength, $\lambda_2$, e.g. <1 μm and more typically in the visible spectrum, e.g. 300-900 nm. The alignment laser source 306 may be positioned to direct its laser beam through the optic 304 and onto the beam path 302. For the system 12", the optic 302 may be configured to be highly reflective for light having a wavelength and highly transmissive for light having a wavelength $\lambda_2$. As shown, a monitor 308 may be positioned to receive the alignment laser beam, in this case as a reflection from laser input window 310 to verify an alignment of the optic components positioned along the beam path 302 between the optic 304 and window 310.

FIG. 3 further shows that a droplet generator 92' may be positioned to deliver a series of droplets 26' moving on a path which intersects the beam path 302. During this intersection, a droplet from the droplet generator may reflect light along the beam path 302, cooperating with the optic 304 to establish an optical cavity passing through the amplifier chambers 300*a-c*. Specifically, the arrangement is configured so the reflectivity of the droplet is sufficient to cause optical gains to exceed optical losses in the cavity when the gain medium is excited generating a laser beam for irradiating the droplet 26', creating a plasma and producing an EUV light emission. With this arrangement, the optic 304, amplifiers 300*a-c* and droplet 26' combined to form a so-called "self-targeting" laser system in which the droplet serves as one mirror (a so-called plasma mirror or mechanical q-switch) of the optical cavity. Self-targeting laser systems are disclosed and claimed in U.S. patent application Ser. No. 11/580,414 filed on Oct. 13, 2006 entitled, DRIVE LASER DELIVERY SYSTEMS FOR EUV LIGHT SOURCE, the entire contents of which are hereby incorporated by reference herein.

FIG. 3 also shows that the system 12" may include a beam focusing subsystem having a focusing optic 208, e.g. off-axis parabolic mirror, as described above. It can also be seen that the system 12" may include a beam steering subsystem having three steering mirrors 210, 212, 214, each mounted on a respective tip-tilt actuator 216, 218, 220, as described above.

Figure 4:
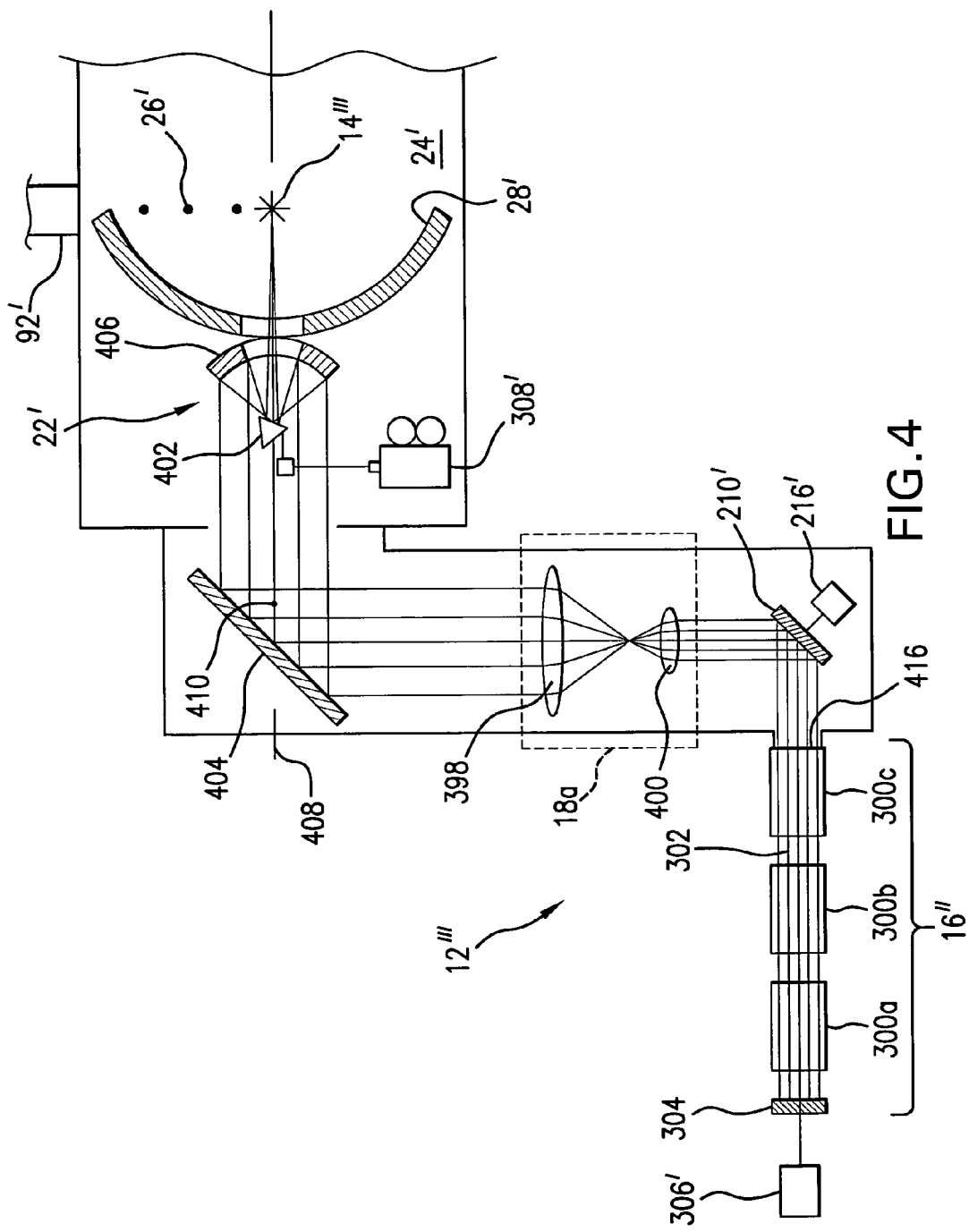
FIG. 4 shows a simplified, schematic, sectional view of an EUV light source having a self-targeting drive laser and a Cassegrainian focusing sub-system.

FIG. 4 shows another particular embodiment of a system 12''' for generating and delivering a train of light pulses to an irradiation site 14''' having one or more components in common with the embodiments shown in FIGS. 2 and 3 and described above. As shown, the system 12''' may include a device 16" generating pulses, a to beam shaping subsystem 18*a*, a beam steering subsystem and a beam focusing subsystem 22'.

FIG. 4 shows a first specific embodiment of a beam shaping subsystem 18*a* having positive lenses 398, 400 that are spaced apart along the beam path 302 and arranged to focus the beam to a waist between the lenses 398, 400. With this arrangement, the beam shape may be altered such that a pre-selected beam width, W, and/or divergence, θ, may be obtained at a pre-selected distance (measured along the beam path 302) downstream of the subsystem 18a. More specifically, the distance between the lenses 398, 400, along the path, determines the beam width, W, and/or divergence, θ, at a pre-selected downstream location. For the system 12", the distance between lenses 398, 400 may be fixed, adjustable or adjustable in response to a control signal (a so-called adaptive optic arrangement, as described below). For example, one or both the lenses may be mounted on an actuator, e.g., stepper motor and/or piezoelectric actuator.

As shown in FIG. 4, the device 16" may include an amplifier having a chain of amplifier chambers 300a-c, arranged in series along the beam path 302, each chamber having its own gain medium and excitation source, e.g., RF pumped, fast axial flow, $CO_2$ amplifier chambers (as described above), having a combined one pass gain of, for example, 1,000-10,000 for amplifying light of a wavelength $\lambda_1$, e.g. 10.6 μm.

It can further be seen in FIG. 4 that an optic 304 may be provided, as described above, e.g., configured to be highly reflective for light having a wavelength $\lambda_1$, and highly transmissive for light having a wavelength $\lambda_2$. As shown, the system 12" may also include an alignment laser source 306' generating an alignment laser beam having a wavelength, $\lambda_2$, e.g. <1 μm and more typically in the visible spectrum, e.g., 300-900 nm. The alignment laser source 306' may be positioned to direct its laser beam through the optic 304 and onto the beam path 302. As shown, a monitor 308', as described above, may be positioned to receive the alignment laser beam, in this case as a reflection from a surface of reflector 402 to verify an alignment of the optical components positioned along the beam path 302 between the optic 304 and reflector 402.

FIG. 4 further shows that a droplet generator 92' may be positioned to deliver a series of droplets 26' moving on a path which intersects the beam path 302. During this intersection, a droplet from the droplet generator may reflect light along the beam path 302, cooperating with the optic 304 to establish an optical cavity passing through the amplifier chambers 300a-c. With this arrangement, the optic 304, amplifiers 300a-c and droplet 26' combined to form a so-called "self-targeting" laser system, as described above.

FIG. 4 also shows that the system 12''' may include a beam steering subsystem having steering mirror 210' mounted on a tip-tilt actuator 216' as described above, a turning mirror 404 and a beam focusing subsystem 22' having a reflector 402 and reflector 406. As shown, turning mirror 404 directs the beam onto a portion of beam path 302 that is aligned along linear axis 408.

Figure 5:
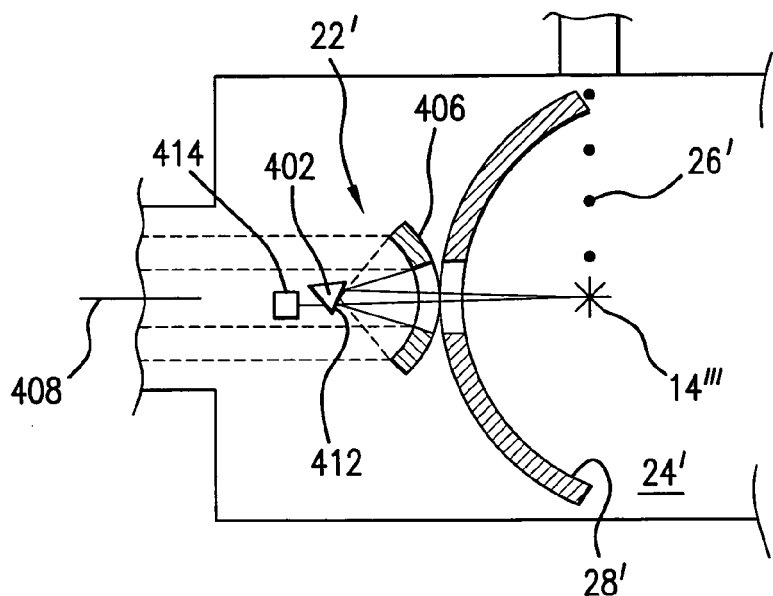
FIG. 5 shows a detailed, sectional view of a Cassegrainian focusing sub-system.

FIG. 5 shows the beam focusing subsystem 22' in greater detail. As seen there, the focusing subsystem 22' may include reflector 406 having a focal point 410. For the subsystem 22', the reflector 406 is positioned with the focal point 410 on the linear axis 408 and the reflector 402 is positioned to receive light from the reflector 406 and direct the laser light toward said irradiation site 14'''. Such an optical arrangement, and variations thereof, is sometimes referred to as a so-called "Cassegrainian system".

For the sub-system 22', the optic 208 may be parabolic mirror converging incident parallel light to a focal spot, and may be corrected (i.e., modified from a perfect parabola having a uniform reflectance) to reduce aberrations for incident light having a pre-selected beam divergence θ, and/or beam width, W. FIG. 5 shows that one or both of the reflectors 402, 406 may be positioned in the chamber 24', in fluid communication with the irradiation site 14''' and may be exposed to plasma generated debris. As indicated above, the use of relatively long wavelength light such as a 9.3 μm or 10.6 μm, may allow relatively strong reflections from surfaces coated with plasma source materials such as tin. Also shown in FIG. 5, the EUV reflective mirror 28' may be positioned to interpose the EUV reflective mirror 28' between the reflector 406 and the irradiation site 14''' along the linear axis. Reflector 402 may have a flat or curved surface 412 which may also be corrected to reduce aberrations within the sub-system 22'. In addition, the reflector 402 may be either fixed in position and/or orientation, moveable in position and/or orientation or, as shown, operably couple to a tip-tilt actuator 414 (which may or may not be disposed in the chamber 24') for moving the reflector 402 independently in two dimensions, e.g., in response to a control signal. Another actuator (not shown) may be employed to selectively move the reflector 402 along the linear axis 408. Although the focusing subsystem 22' is shown used in combination with the 'self-targeting' laser source 16" in FIG. 4, it is to be appreciated that it may also be used in combination with other sources including the MOPA source 16" shown in FIG. 3.

For the arrangement shown in FIG. 4, a single window 416 can be used to separate the near vacuum environment of the chamber 26' and the gain medium, e.g., gas containing $CO_2$ in the chamber 300c. This allows all of the optics from the device 16" to the irradiation site 14''' to be in the near vacuum environment. Alternatively, a laser input window can be placed downstream of the mirror 210', subsystem 18a or mirror 404.

For some applications, the arrangement shown in FIG. 4 may be advantageous over the arrangement shown in FIG. 3 in that it may reduce aberration sensitivity to the final focusing optic, whereas the off-axis parabolic focusing mirror in FIG. 3 has extreme sensitivity of aberrations to input angle. Moreover, in some cases, the embodiment shown in FIG. 3 may require a somewhat cumbersome nested loop control system to properly steer the beam, whereas the arrangement shown in FIG. 4 may, in some cases, be implemented without nested loop control between the mirror 210' and the reflector 402 (e.g. pointing control may be achieved with the movement of reflector, only). An additional advantage for the arrangement shown in FIG. 5, in that the alignment laser references to all optics between the optic 304 and reflector 402 whereas the alignment laser in FIG. 3 only references optics to the laser input window 308. Also, the Cassegrainian arrangement of FIG. 4 forces the device 16" to operate on a beam having a donut or ring-shaped cross-section which in some cases may lead to better gain extraction. With the above in mind, it is to be appreciated that other factors/considerations may cause the FIG. 3 embodiment to be preferred in some applications.

Other arrangements for beam shaping, pulse shaping, focusing, steering and/or adjusting the focal power of pulses are disclosed in co-pending U.S. patent application Ser. No. 11/358,992 filed on Feb. 21, 2006, entitled LASER PRODUCED PLASMA EUV LIGHT SOURCE, the contents of which are hereby incorporated by reference herein.

Figure 6:
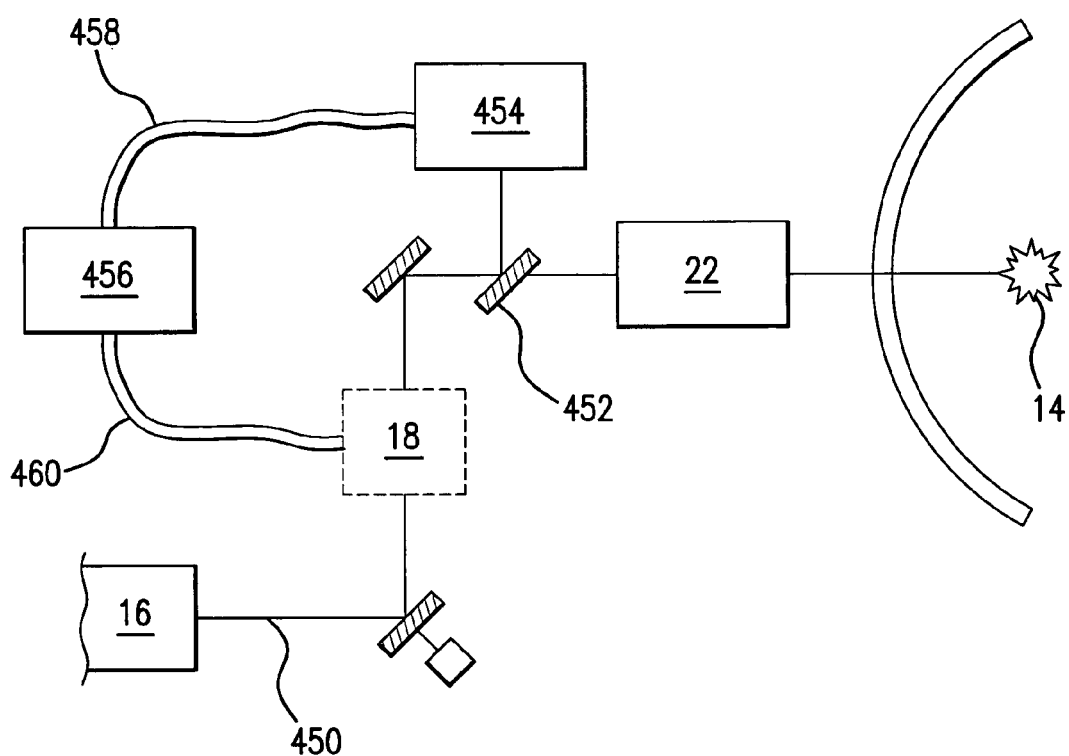
FIG. 6 shows an embodiment of a control loop for presenting a beam to a focusing sub-system with a pre-selected beam parameter such as beam width or divergence.

FIG. 6 shows an embodiment having a device 16 outputting a laser beam onto a beam path 450 and a beam shaping sub-system 18 disposed along the beam path 450. As shown, an optic 452, e.g., pickoff mirror or beam splitter, may be positioned downstream of the beam shaping sub-system 18 (in some cases, the optic 452 may be placed close to or immediately upstream to the focusing sub-system 22) for directing some or all of the beam to a monitor 454. With this arrangement, one or more beam parameters may be measured and if necessary adjusted upstream of the focusing sub-system 22. For example, the monitor 454 may measure beam width, (e.g., the diameter of the beam in which the intensity has fallen to 1/e for a beam with a Gaussian intensity distribution), wavefront and/or divergence, e.g., calculated for a beam having circular cross-section by:

$$\theta = 2 \arctan((W_f - W_i)/2l)$$

where $W_i$, $W_f$ are the beam width at two separate points and (l) is the distance between these points. For these purposes, the monitor 454 may include a monitor such as a Hartman-Shack monitor for measuring divergence or wavelength, an optical setup for measuring divergence having e.g., an interferometer, etc. Alternatively, multiple beam splitters/monitors may be used to measure the beam width at two locations along the beam path to calculate divergence. Once measured, the monitor 454 can produce a signal indicative of the measured beam parameter and convey the signal to a controller 456 over line 458. Controller 456 may then use the signal (alone or together with one or more previous signals and/or a control algorithm) to generate a control signal which is then conveyed to the beam shaping sub-system 18 via line 460. Although shown as separate components, it is to be appreciated that the monitor 454 and controller 456 may be integrated into a common unit, sharing common circuit boards, I/O, etc. In response to the control signal, beam shaping sub-system 18 may change to adjust one or more beam parameters such that a pre-selected beam width, divergence, wavefront, etc. is presented to the focusing sub-system 18.

FIGS. 4, 7-11 show examples of optical configurations (designated 18a-f) which can be employed as the beam shaping sub-system 18 in FIG. 6 (note also that the each of these configurations 18a-f may be employed in the embodiment shown in FIGS. 1-6 and 7-8 (as discussed below). As indicated above, the beam shaping sub-system 18a shown in FIG. 4 can include a pair of positive lens 398, 400 generating a beam waist therebetween, the interspacing distance of which may be modified in response to a control signal to alter beam divergence and/or beam width of the beam exiting the sub-system 18a.

Figure 7:
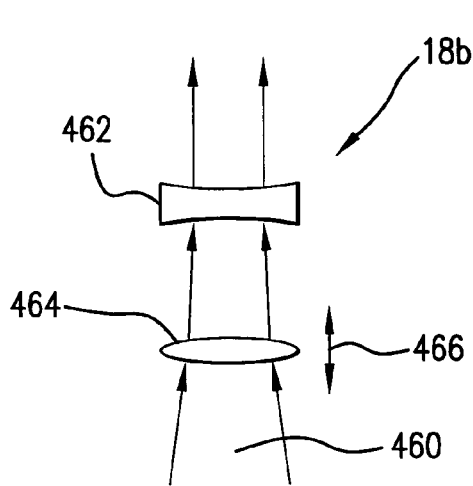
FIGS. 7-11 show various optical configurations suitable for use as a beam shaping sub-system.

FIG. 7 shows a beam shaping sub-system 18b which may include a negative lens 462 spaced from a positive lens 464 along a beam path, 460, the interspacing distance of which may be modified (e.g., by moving lens 464 in direction of arrow 466) in response to a control signal to alter beam divergence and/or beam width of the beam exiting the sub-system 18b. For the sub-system 18b either lens 462, 464 may also function as a laser input window to the plasma chamber 24 or as a laser chamber output window maintain the laser gain medium in the chamber.

Figure 8:
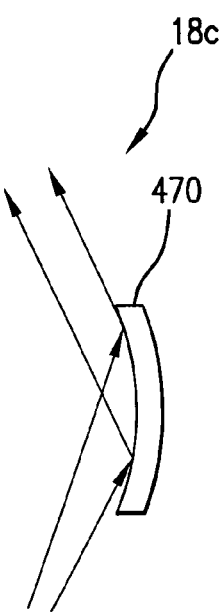

FIG. 8 shows a beam shaping sub-system 18c which may include a mirror 470 positioned along a beam path that is selectively deformable (e.g., by changing the concavity of the reflective surface) in response to a control signal to alter beam divergence and/or beam width of the beam exiting the sub-system 18c. For the sub-system 18c, the mirror 470 may be include a flexible member that deformed mechanically or thermally, or the mirror 470 may include a plurality of facets that may be displaced independently by a respective actuator to alter the reflective surface.

Figure 9:
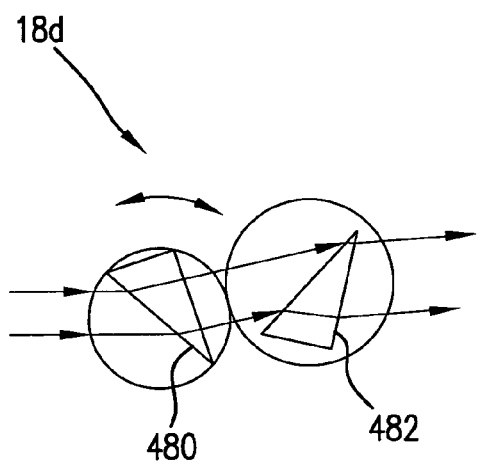

FIG. 9 shows a beam shaping sub-system 18d which may include two spaced-apart prisms 480, 482 positioned along a beam path, one or both of which are rotatable on the beam path in response to a control signal to alter beam divergence and/or beam width of the beam exiting the sub-system 18d.

Figure 10:
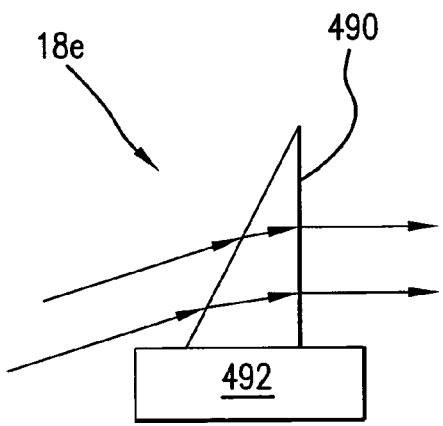

FIG. 10 shows a beam shaping sub-system 18e which may include an optic 490, which may be for example a prism (as shown) or a lens (not shown) positioned along a beam path that is heated/cooled by a temperature control unit 492, e.g., heater, in response to a control signal to change the refractive index of the optic material and thereby alter beam divergence and/or beam width of the beam exiting the sub-system 18e.

Figure 11:
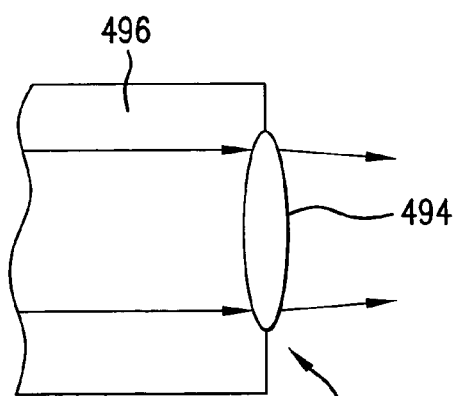

FIG. 11 shows a beam shaping sub-system 18f which may include an optic 494, which may be for example a lens (as shown), positioned along a beam path that may be deformed, e.g. mechanically and/or heated/cooled to change the optic materials' refractive index in response to a control signal to thereby alter beam divergence and/or beam width of the beam exiting the sub-system 18f. As shown, the optic may also serve as an output window of a laser chamber 496.

Figure 12:
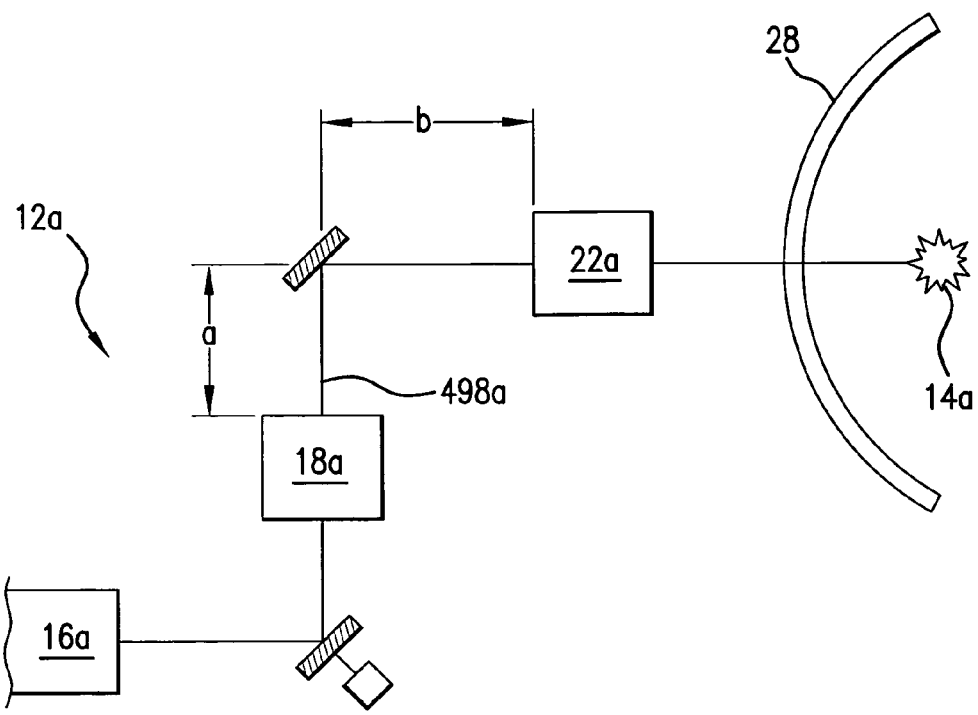
FIG. 12 illustrates a first system installation in which a beam focusing subsystem is spaced from the beam shaping subsystem along the beam path by a distance $D_1$.

FIG. 12 shows a first installation of a first system 12a for generating and delivering a train of light pulses to an irradiation site 14a having a device 16a generating pulses, a beam shaping subsystem 18a and a beam focusing subsystem 22a that is spaced from the beam shaping subsystem 18a along the beam path 498a by a distance $D_1 = a + b$.

Figure 13:
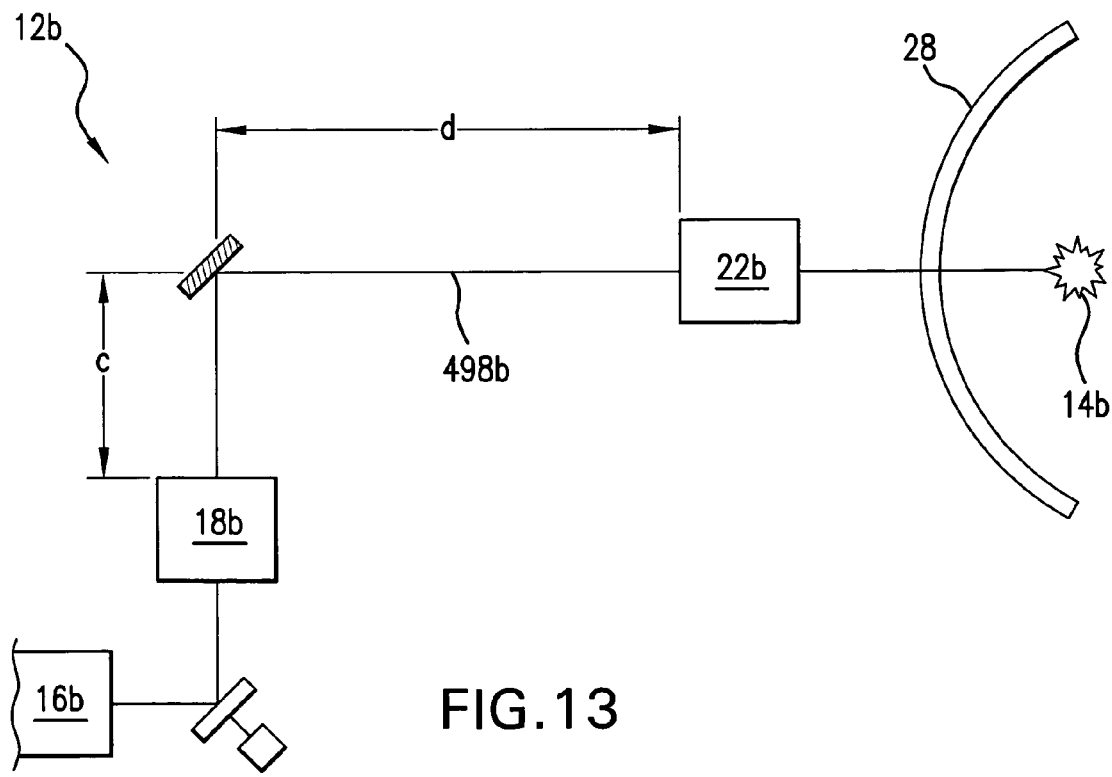
FIG. 13 illustrates a second system installation in which a beam focusing subsystem is spaced from the beam shaping subsystem along the beam path by a distance $D_2$.

FIG. 13 shows a second installation of a second system 12b for generating and delivering a train of light pulses to an irradiation site 14b having a device 16b generating pulses, a beam shaping subsystem 18b and a beam focusing subsystem 22b that is spaced from the beam shaping subsystem 18b along the beam path 498b by a distance $D_2 = c + d$, where $D_1 \ne D_2$. These different installations may arise in practice due to variations in design and floor-plan at different fabrication sites. For the two systems, a single, common setting of the beam shaping subsystems 18a,b would result in beams having differing beam parameters, e.g., beam width, divergence, wavefront, etc. reaching the respective beam focusing sub-system 22a,b due to the differing amount of free space beam propagation and expansion. However, as indicated above, optics in the beam focusing subsystems 22a,b, which may be, for example, the near—parabolic reflector in a Cassegrainian arrangement (see FIG. 5) or an off-axis parabolic (see FIGS. 2 and 3) may be corrected (i.e., modified from a perfect parabola having a uniform reflectance) to reduce aberrations for incident light having a pre-selected beam divergence $\theta$, and/or beam width, W. One solution would be to provide a reflector having a unique correction for each installation. Applicants propose a simpler, more cost-effective solution.

Figure 14:
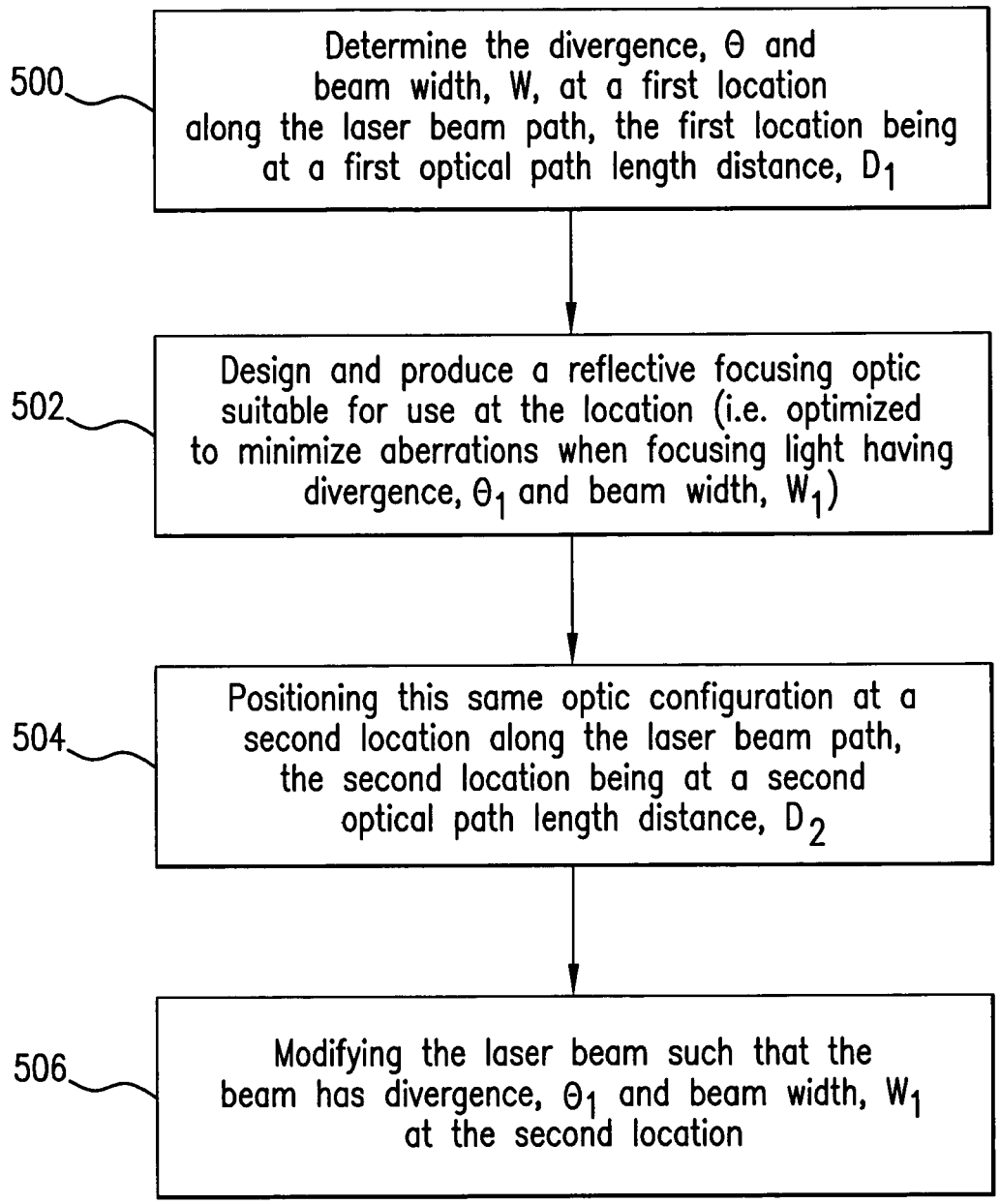
FIG. 14 is a flow chart showing a process for using a common, corrected focusing optic at different distances, D from a beam shaping subsystem.

As shown in FIG. 14, a process for using the same corrected focusing optic at different distances, D from a beam shaping subsystem may include the steps of determining, e.g., by measurement, one or more beam parameters such as the divergence, $\theta$ and/or beam width, W, at a first location (e.g., FIG. 12) along the laser beam path, the first location being at a first optical path length distance, $D_1$ (box 500). Next, a corrected reflective focusing optic suitable for use at the first location is designed and produced (i.e., optimized to minimize aberrations when focusing light having divergence, $\theta_1$ and beam width, $W_1$) (box 502). Once designed and produced, the same optic configuration may be used at a second location (e.g., FIG. 13) along the laser beam path, the second location being at a second optical path length distance, $D_2$ (Box 504) by modifying the laser beam such that the beam has divergence, $\theta_1$ and beam width, $W_1$ at the second location (box 506).

As used herein, the term "optic" and its derivatives includes, but is not necessarily limited to, one or more components which reflect and/or transmit and/or operate on incident light and includes, but is not limited to, one or more lenses, windows, filters, wedges, prisms, grisms, gradings, transmission fibers, etalons, diffusers, homogenizers, detectors and other instrument components, input apertures, axicons and/or mirrors including multi-layer mirrors, near-normal incidence mirrors, grazing incidence mirrors, specular reflectors and diffuse reflectors. Moreover, unless otherwise specified, neither the term "optic" nor its derivatives, as used herein, are meant to be limited to components which operate solely or to advantage within one or more specific wavelength range(s) such as at the EUV output light wavelength, the irradiation laser wavelength, a wavelength suitable for metrology or some other wavelength.

While the particular embodiment(s) described and illustrated in this patent application in the detail required to satisfy 35 U.S.C. §112 are fully capable of attaining one or more of the above-described purposes for, problems to be solved by, or any other reasons for or objects of the embodiment(s) above-described, it is to be understood by those skilled in the art that the above-described embodiment(s) are merely exemplary, illustrative and representative of the subject matter which is broadly contemplated by the present application. Reference to an element in the following Claims in the singular is not intended to mean nor shall it mean in interpreting such Claim element "one and only one" unless explicitly so stated, but rather "one or more". All structural and functional equivalents to any of the elements of the above-described embodiment(s) that are known or later come to be known to those of ordinary skill in the art are expressly incorporated herein by reference and are intended to be encompassed by the present Claims. Any term used in the Specification and/or in the Claims and expressly given a meaning in the Specification and/or Claims in the present Application shall have that meaning, regardless of any dictionary or other commonly used meaning for such a term. It is not intended or necessary for a device or method discussed in the Specification as an embodiment to address or solve each and every problem discussed in this Application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. §112, sixth paragraph, unless the element is expressly recited using the phrase "means for" or, in the case of a method claim, the element is recited as a "step" instead of an "act".

We claim:

1. An EUV light source comprising;
   a laser beam travelling along a beam path, at least a portion of the beam path aligned along a linear axis;
   a material for interaction with the laser beam at an irradiation site to create an EUV light emitting plasma;
   a first reflector having a focal point, the first reflector positioned with the focal point on the linear axis, the first reflector receiving laser light along the beam path;
   a second reflector receiving laser light reflected by said first reflector and directing the laser light toward said irradiation site; and
   an adaptive optic adjustable to selectively vary beam width and divergence of the laser beam at the first reflector.

2. An EUV light source as recited in claim 1 wherein said source further comprises a vessel, the irradiation site is within the vessel and the first reflector is positioned in the vessel and in fluid communication with the irradiation site.

3. An EUV light source as recited in claim 1 further comprises an EUV reflective mirror having a first focus at the irradiation site and a second focus, the EUV reflective mirror positioned to interpose the EUV reflective mirror between the first reflector and the irradiation site along the linear axis.

4. An EUV light source as recited in claim 1 further comprising a laser device generating said laser beam, said laser device comprising at least one reflective optic establishing a beam path through the irradiation site and wherein said material cooperates with said optic to establish an optical cavity therebetween when said material is at said irradiation site, and wherein said laser device further comprises a gain medium excitable to establish optical gains exceeding optical losses in said cavity to generate a laser beam for irradiating said material.

5. An EUV light source as recited in claim 4 wherein said reflective optic transmit light at a wavelength, $\lambda$, and said EUV light source further comprises an alignment laser passing an alignment laser beam having a wavelength, $\lambda$, through the reflective optic and a monitor receiving said alignment laser beam after reflection from said second reflector.

6. An EUV light source as recited in claim 1 wherein said second reflector is mounted on a tip/tilt actuator.

7. An EUV light source as recited in claim 1 wherein said first reflector has a corrected parabolic shape.

8. An EUV light source as recited in claim 1 wherein said second reflector is formed with a flat reflective surface.

9. An EUV light source as recited in claim 1 wherein said second reflector is formed with a curved reflective surface.

10. An EUV light source as recited in claim 1 wherein said laser device has a gain medium comprising $CO_2$ and said material comprises tin.

11. An EUV light source comprising;
    an optic for reflecting light of wavelength $\lambda_1$, and transmitting light of wavelength $\lambda_2$, with $\lambda_1 \neq \lambda_2$,
    a material cooperating with said optic to establish an optical cavity therebetween when said material is at an irradiation site;
    a gain medium excitable to establish optical gains exceeding optical losses in said cavity to generate a laser beam for irradiating said material to produce an EUV light emission;
    an alignment laser positioned to pass an alignment laser beam having a wavelength, $\lambda_2$, through the reflective optic; and
    a monitor receiving said alignment laser beam to verify an alignment of at least one optic in said cavity.

12. An EUV light source as recited in claim 11 wherein said material is a liquid droplet.

13. An EUV light source as recited in claim 11 wherein $\lambda_1 > 5$ μm and $\lambda_2 < 1$ μm.

14. An EUV light source comprising;
    a laser beam travelling along a beam path;
    an optic focusing said laser beam to an irradiation site on the beam path;
    a material for interaction with the laser beam at the irradiation site to create an EUV light emitting plasma;
    a monitor measuring a beam parameter and outputting a signal indicative thereof; and
    an adaptive optic responsive to the signal for modifying the laser beam to have a pre-selected beam divergence and beam width at the focusing optic.

15. An EUV light source as recited in claim 14 wherein said adaptive optic comprises first and second optical components with the first optical component moveable relative to the second optical component.

16. An EUV light source as recited in claim 14 wherein said adaptive optic comprises at least one deformable optical component.

17. An EUV light source as recited in claim 14 wherein said beam parameter is divergence.

18. An EUV light source as recited in claim 14 wherein said beam parameter is wavefront.

19. An EUV light source as recited in claim 14 wherein said beam parameter is beam width.

20. An EUV light source comprising;
a laser beam travelling along a beam path, at least a portion of the beam path aligned along a linear axis;
a material for interaction with the laser beam at an irradiation site to create an EUV light emitting plasma;
a first reflector having a focal point, the first reflector positioned with the focal point on the linear axis, the first reflector receiving laser light along the beam path;
a second reflector receiving laser light reflected by said first reflector and directing the laser light toward said irradiation site; and
a laser device generating said laser beam, said laser device comprising at least one reflective optic establishing a beam path through the irradiation site and wherein said material cooperates with said optic to establish an optical cavity therebetween when said material is at said irradiation site, and wherein said laser device further comprises a gain medium excitable to establish optical gains exceeding optical losses in said cavity to generate a laser beam for irradiating said material, wherein said reflective optic transmit light at a wavelength, $\lambda$, and said EUV light source further comprises an alignment laser passing an alignment laser beam having a wavelength, $\lambda$, through the reflective optic and a monitor receiving said alignment laser beam after reflection from said second reflector.

21. An EUV light source as recited in claim 20 wherein said source further comprises a vessel, the irradiation site is within the vessel and the first reflector is positioned in the vessel and in fluid communication with the irradiation site.

22. An EUV light source as recited in claim 20 further comprises an EUV reflective mirror having a first focus at the irradiation site and a second focus, the EUV reflective mirror positioned to interpose the EUV reflective mirror between the first reflector and the irradiation site along the linear axis.

23. An EUV light source as recited in claim 20 wherein said second reflector is mounted on a tip/tilt actuator.

24. An EUV light source as recited in claim 20 wherein said first reflector has a corrected parabolic shape.

25. An EUV light source as recited in claim 20 wherein said second reflector is formed with a flat reflective surface.

26. An EUV light source as recited in claim 20 wherein said second reflector is formed with a curved reflective surface.

27. An EUV light source as recited in claim 20 wherein said laser device has a gain medium comprising $CO_2$ and said material comprises tin.

28. An EUV light source as recited in claim 20 further comprising an adaptive optic adjustable to selectively vary beam width and divergence of the laser beam at the first reflector.

* * * * *